United States Patent [19]
Berg

[11] 4,283,184
[45] Aug. 11, 1981

[54] NON-METALLIC SILENT CHAIN

[75] Inventor: Winfred M. Berg, East Rockaway, N.Y.

[73] Assignee: Winfred M. Berg, Inc., East Rockaway, N.Y.

[21] Appl. No.: 34,554

[22] Filed: Apr. 30, 1979

[51] Int. Cl.³ ............................................... F16G 1/28
[52] U.S. Cl. .................................... 474/203; 74/411; 198/834; 474/205
[58] Field of Search .................... 74/231 C, 232, 233, 74/234, 245 R, 245 S, 461, 411; 156/137, 138; 64/11 R, 14, 27 R, 27 NM; 474/203, 205, 238, 249, 250, 252, 234, 271; 198/834, 844

[56] References Cited

U.S. PATENT DOCUMENTS

| | | | |
|---|---|---|---|
| 2,054,619 | 9/1936 | Freedlander | 74/233 |
| 2,067,400 | 1/1937 | Koplin et al. | 74/233 |
| 3,109,219 | 11/1963 | De Bell et al. | 74/231 R |
| 3,636,792 | 1/1972 | Vigl | 74/461 |
| 4,002,082 | 1/1977 | Waugl | 74/231 C |
| 4,019,399 | 4/1977 | Waugh | 74/231 C |
| 4,026,162 | 5/1977 | Berg | 74/231 C |
| 4,127,041 | 11/1978 | Imazaike | 74/461 X |

FOREIGN PATENT DOCUMENTS

| | | | |
|---|---|---|---|
| 270023 | 2/1914 | Fed. Rep. of Germany | 74/461 |
| 2340939 | 3/1974 | Fed. Rep. of Germany | 74/231 C |
| 1336389 | 11/1973 | United Kingdom | 74/231 C |

*Primary Examiner*—C. J. Husar
*Assistant Examiner*—Moshe I. Cohen
*Attorney, Agent, or Firm*—Holland, Armstrong, Wilkie & Previto

[57] ABSTRACT

A toothed transmission chain or belt is described for use in coupling spaced sprockets or gears. The chain is formed of molded polyurethane or other plastic having sprocket engaging teeth molded onto a supporting unitary molded backing. The molded portion is reinforced by one or more metal cables which are embedded in the molded plastic portion. An improved engagement with the sprockets is provided for by providing lateral slots in the chain teeth thereby giving them variable width. Additionally, the chain may be furnished or originally formed in indeterminate lengths and then fashioned into an endless chain by exposing and splicing together the ends of the steel reinforcing cables.

5 Claims, 6 Drawing Figures

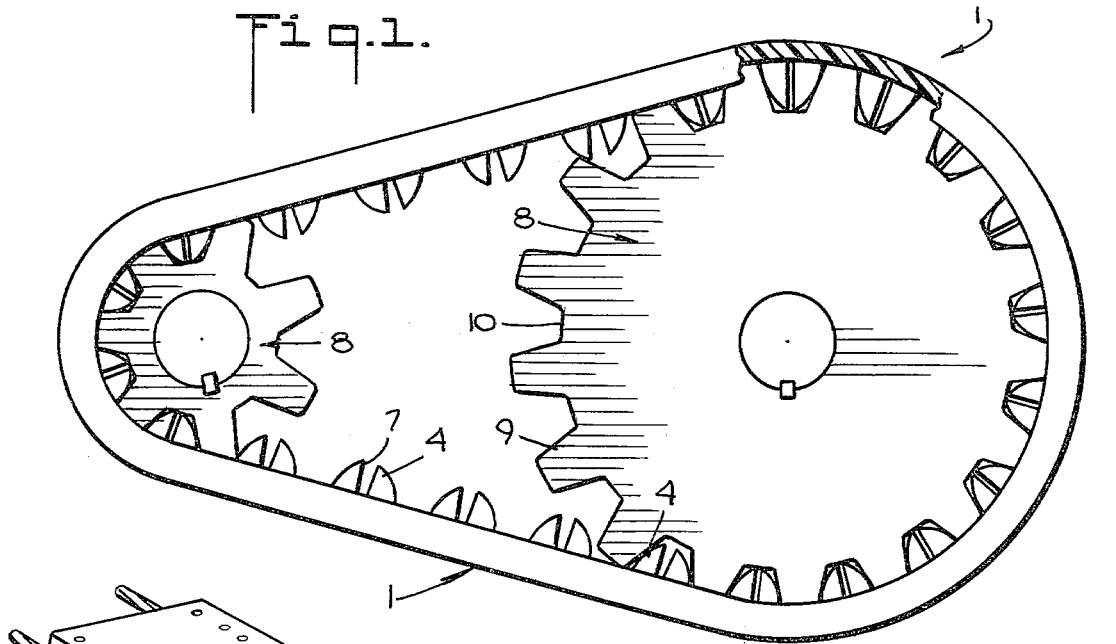
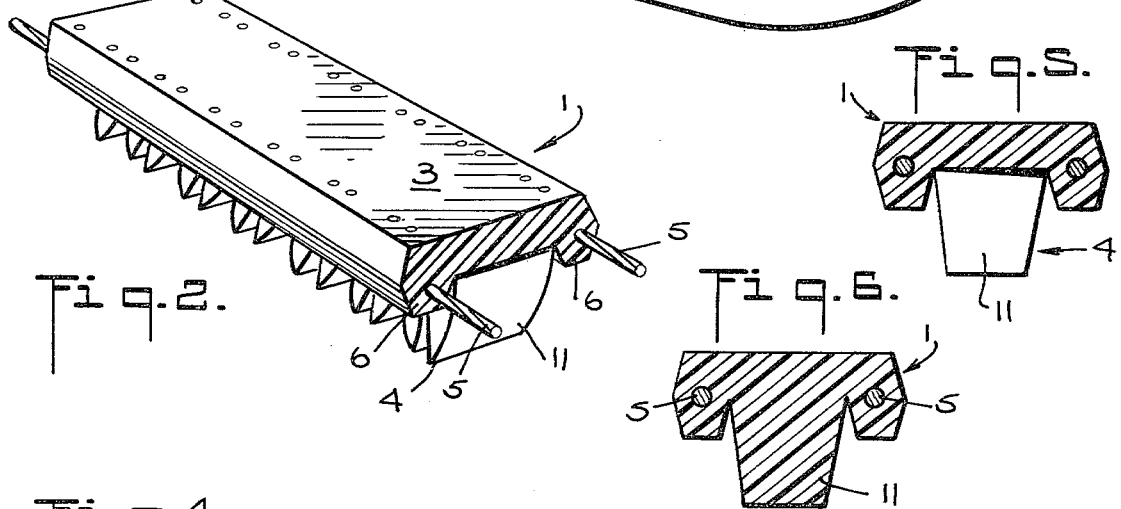
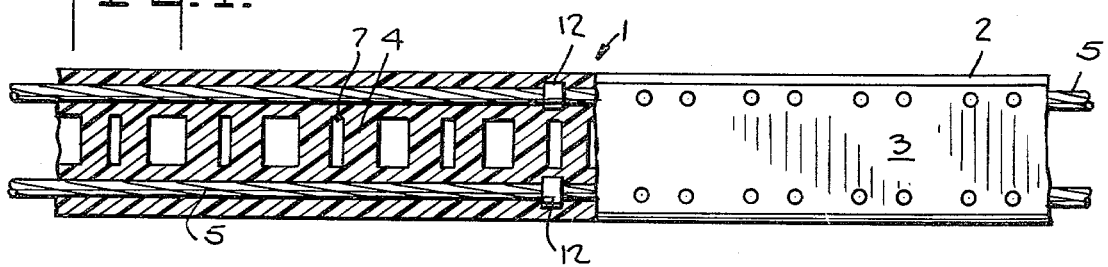
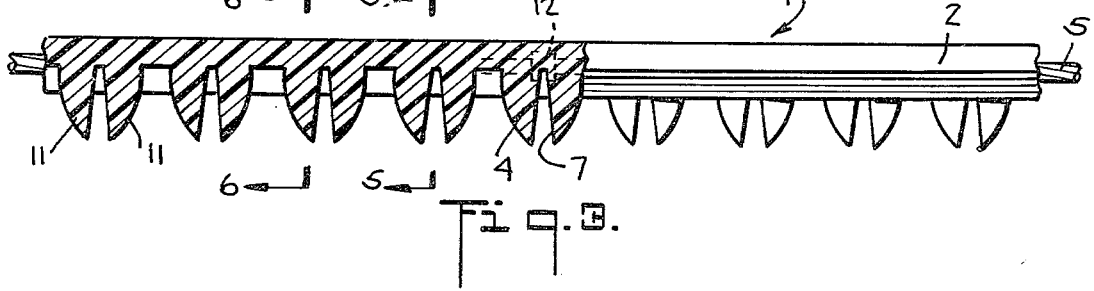

NON-METALLIC SILENT CHAIN

BACKGROUND OF THE INVENTION

The present invention relates to transmission belts or chains of the toothed type for coupling spaced gears or sprockets in installations such as timing chains and other positive drive systems. More particularly, the invention relates to an improved composite drive chain having a unitary molded plastic body reinforced with spaced steel cables embedded in the molded plastic body.

Plastic belts or other molded chains are known which are employed in certain transmission means including timing devices and other synchronized drive systems. Molded plastic drive chains have several inherent advantages over the previous link belt or other metallic silent chain drives. Molded plastic drives, for example, eliminate the need for lubrication and are further characterized by lightweight, minimal backlash, silent running, rust proof operation and the avoidance of metal to metal contact.

The silent chain of the present invention represents a further improvement over such molded plastic chains including the chain shown in applicant's issued U.S. Pat. No. 4,026,162. That chain had a flexible molded body reinforced with steel cables and included integral molded teeth shaped for closely engaging each of the driven sprocket teeth. The belt of the present invention represents an improvement by having an improved design of the molded plastic portion including split teeth for significantly minimizing backlash between the driven elements, and, additionally has an improved chain cross-section including partially molded flanges to further eliminate the need for any belt guiding flanges on the connected sprockets or pulleys.

Accordingly, an object of the present invention is to provide an improved lightweight composite plastic and cable chain capable of operating with minimal backlash.

Another object of the present invention is to provide an improved composite plastic and cable chain having integral flanges for reliable operation and improved pulley guidance.

Another object of the present invention is to provide an improved, simplified, silent, corrosion proof composite plastic and cable driven belt.

Another object of the present invention is to provide an improved toothed drive belt with an improved weight to strength relationship.

Another object of the present invention is to provide an improved composite lubrication-free drive chain.

Another object of the present invention is to provide an improved composite and positive drive chain adapted for being formed in loops of differing size.

Other and further objects of the present invention will become apparent upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawing, forming a part of the specification, wherein:

FIG. 1 is a side elevational view of a drive system using a drive chain in accordance with the present invention.

FIG. 2 is a fragmentary perspective view of the preferred embodiment of the drive chain.

FIG. 3 is an enlarged fragmentary side elevational view partially in section of the belt of FIGS. 1 and 2.

FIG. 4 is an enlarged fragmentary top plan view partially in section of the drive chain of FIGS. 1 through 3.

FIGS. 5 and 6 are vertical sectional views of the chain taken along lines 5—5 and 6—6 of FIG. 3.

DESCRIPTION OF THE PREFERRED EMBODIMENT

The preferred embodiment of the drive chain 1 comprises a molded body portion 2 with a flexible backing portion 3 and with depending sprocket engaging and spaced teeth 4. The molded portion 2 of the belt 1 is strengthened or reinforced by a pair of embedded stainless steel cables 5 preferably contained within the spaced flange portions 6 of the belt backing portion 3. The sprocket engaging teeth 4 extend between the flange portions 6 and include a tapered transverse slot 7. The slot 7 is provided to permit the teeth 4, while in engagement with the sprocket 8, to compress and to thereby exactly occupy the opening 10 between adjacent teeth 9 of the sprocket 8. The tapered slots 7 are formed to remain slightly open when a tooth 4 is fully engaged between the sprocket teeth 9 and the slots 7 are proportioned so that they normally remain slightly open for a normal sprocket opening 10 and so that they thereby may fit a possible slightly undersize sprocket opening 10.

The chain teeth 4 are illustrated in both their free and driving positions in FIG. 1 and the compression or narrowing of each of the tooth slots 7 is seen by comparing the relative sizes of the slots 7 for the teeth 4 engaged with the sprockets 8 with those teeth 4 intermediate to the sprockets 8.

The rounded outer surfaces 11 of each of the teeth 4 combines with the tapered form of the openings 10 between the sprocket teeth 9 to provide a wedging and slippage reducing drive chain action. The smoothness of the non-slip drive is facilitated by the resilient characteristics of the molded plastic chain 1 and the flared and relatively hard surfaces of the cooperating sprocket teeth 9. With the relatively large number of drive chain teeth 4 snugly engaged with their cooperating sprocket openings 10, the drive chain 1 is firmly coupled with both the drive sprocket and the driven sprocket so that there can be no significant backlash or random motion between the drive chain 1 and the coupled sprockets 8. A close coupling is obtained in this manner between the molded plastic chain 1 and the sprockets 8 without metal to metal contact so that a silent and self-lubricating drive action results with true linear speeds.

A convenient way of manufacturing the belts 1 comprises an extrusion or other means for producing belts or chains of indeterminate length of polyurethane. A large number of differing closed chain loops may then be produced by splicing opposite ends of cut chain lengths together. A preferred splicing means is illustrated in FIGS. 3 and 4. Portions of the molded plastic backing 3 are cut away to expose short lengths of the reinforcing cables 5. Abutting ends of the cable are then firmly connected together by pressure applied or crimped metallic bushings 12 applied by a plier-like tool. Preferably, the indeterminate lengths of the belt are cut at the center line of two tooth members 4, as illustrated in FIG. 3. The removed portion of the plastic body of the chain 1 may then be overmolded or replaced either using production molding means or a simple field splicing kit in which compatible and adhesive belt material is used to refill the cut-away portions of the chain around and covering the bushings 12. Thus, the form in accordance with the above described preferred embodiment may be formed in preset sizes in the original manufacture and may be formed to the desired length in point-of-use applications.

It will be seen that an improved drive chain has been described. The improved chain has more than adequate strength resulting from its combination of reinforcing cables and a molded plastic body, and this form of the chain is easily manufactured by extrusion or other molding processes in indefinite lengths permitting individual chains to be readily formed to size. The chain is also characterized by significant flexibility permitting it to be used on small sprockets and in systems with angularly aligned sprockets. The belt is light in weight and is adapted for lubrication-free operation without backlash or chain whip and with silent, rust-proof operation.

As various changes may be made in the form, construction and arrangement of the parts herein without departing from the spirit and scope of the invention and without sacrificing any of its advantages, it is to be understodd that all matter herein is to be interpreted as illustrative and not in a limiting sense.

Having thus described my invention, I claim:

1. A composite drive chain for coupling with toothed sprockets comprising the combination of an elongated unitary molded plastic body portion, projecting flanges at the two opposite edges of said plastic body portion, spaced sprocket engaging teeth extending outwardly from said plastic body portion, said sprocket engaging teeth having rounded sprocket engaging surfaces at their outer ends, said sprocket engaging teeth being spaced from both of said flanges and having a height above said plastic body portion substantially greater than the height of said flanges, a plurality of metallic cables embedded longitudinally in said plastic body portion at said flanges, and said sprocket engaging teeth having central outwardly flared lateral slots and extending a substantial portion of the height of the sprocket engaging teeth for providing a resilient fit with the sprocket teeth.

2. The drive chain as claimed in claim 1 in which said teeth have rounded front and back lateral surfaces for engaging with flared openings between the sprocket teeth.

3. The drive chain as claimed in claim 1 in which said plastic body portion comprises polyurethane.

4. The drive chain as claimed in claim 1 in which opposite ends of said body portion are coupled together by bushings connecting the cables at the said opposite ends of the body portion.

5. The drive chain as claimed in claim 4 which further comprises a plastic overmolding covering connected ends of the cables.

* * * * *